United States Patent [19]

Liebel

[11] Patent Number: 5,062,751

[45] Date of Patent: Nov. 5, 1991

[54] ECONOMY VOID FILLER

[75] Inventor: Henry L. Liebel, Cincinnati, Ohio

[73] Assignee: Shippers Paper Products Company, Loveland, Ohio

[21] Appl. No.: 669,105

[22] Filed: Mar. 13, 1991

[51] Int. Cl.$^5$ .................. B61D 45/00; B32B 3/12
[52] U.S. Cl. .................... 410/154; 428/12; 428/116; 428/118; 52/807; 156/197; 206/593; 206/814
[58] Field of Search .............. 410/154, 121, 155; 156/197; 428/116, 118, 73, 12; 206/583, 814, 593, 524, 521, 516; 52/806, 807

[56] References Cited

U.S. PATENT DOCUMENTS

| | | | |
|---|---|---|---|
| 2,980,573 | 4/1961 | Clifford | 410/154 X |
| 3,389,665 | 6/1968 | Kauffman | 410/154 |
| 3,854,426 | 12/1974 | Kinnune | 410/154 |
| 3,862,607 | 1/1975 | Loudin | 410/154 X |
| 4,109,587 | 8/1978 | Jansen | 410/154 |
| 4,247,237 | 1/1981 | Brown | 410/121 X |
| 4,300,864 | 11/1981 | Liebel et al. | 410/154 |
| 4,349,303 | 9/1982 | Liebel et al. | 410/154 |
| 4,386,881 | 6/1983 | Liebel | 410/154 |
| 4,585,381 | 4/1986 | Boyse | 410/154 |
| 4,865,889 | 9/1989 | Boyse | 410/154 X |

Primary Examiner—Frank E. Werner
Assistant Examiner—Brian Dinicola
Attorney, Agent, or Firm—Wood, Herron & Evans

[57] ABSTRACT

A relatively inexpensive void filler includes alternately stacked and laminated sheets of V-shaped and W-shaped panels of corrugated board glued together along the center and sides.

1 Claim, 2 Drawing Sheets

ECONOMY VOID FILLER

BACKGROUND OF THE INVENTION

This invention relates to a load spacer or void filler for use between adjacent articles or containers of freight in a shipping vehicle which may be collapsed to a compact package for shipment or storage but can be readily expanded for use. More particularly, this invention relates to an economy void filler which is relatively inexpensive to manufacture for use in shipment of articles of freight.

In the loading of a freight container, such as a railway boxcar or other shipping vehicle or container, it frequently happens that the loads placed therein do not completely fill up the available storage space. Thus, there are left one or more vertical spaces between closely spaced, adjacent unit loads of goods or between the load and the walls of the shipping container. These spaces should be filled to prevent side shifting of the load during transit which could cause damage to the load. Moreover, in some applications, it is desirable to separate the load from the walls of the shipping container to prevent the load from contacting the walls of the container. For example, when shipping goods in paper bags or like paper containers, e.g., bags of cement loaded in railway boxcars, the bags can be torn by the rough walls of the boxcars allowing the contents of the bags to spill. Thus, the load should be spaced from the walls of the shipping vehicle to prevent damage to the containers and to the load.

Prior to the present invention, various forms of load spacers or void fillers have been proposed for filling the spaces between adjacent unit loads of goods. One particular form of void filler is a collapsible honeycomb structure in which a stack of rectangular strips of sheet material, for example, corrugated paperboard, are glued to adjacent strips at spaced and staggered positions such that when expanded the strips define a honeycomb having a plurality of cells. These prior art load spacers typically include one or more elongated, relatively rigid suspension members extending transversely of the honeycomb structure with the ends of the suspension members extending laterally beyond the planar sides of the structure. In use, the suspension members bridge the space and rest on the tops of the spaced loads. The spacer hangs from the suspension members between the pair of spaced apart articles of freight and expands downwardly between the articles under its own weight or it is pulled downwardly toward the bottom of the stack. When no longer needed, the load spacer may then be removed and stored in a collapsed condition for later use. Patents representative of this state of the art include U.S. Pat. Nos. 4,300,864; 4,516,891; 4,585,381; 4,109,587; 3,862,607; 3,842,757; 3,823,675; 3,618,535 and 3,593,671.

Numerous designs of void fillers have been developed over the years to address various problems encountered in the use of void fillers, for example, how best to suspend the void filler, how to overcome such problems as hourglassing of the void filler, and others represented by the patent literature. One of the key problems to be addressed, however, is how to make a void filler which is both effective and relatively inexpensive. This invention is directed to achieving that objective.

SUMMARY OF THE INVENTION

To this end, this invention contemplates a economy void filler made from the corrugated panels which are stacked one upon another and adhered together along a central axis and at the sides thereof whereby the void filler may be suspended from the top of the load and expanded to separate the panels and fill the void.

In a presently preferred form of the invention, the void filler is made of an alternating stack of corrugated panels. A first panel is generally V-shaped and includes a central glue section, a pair of glue flaps at the outboard edges thereof, and a pair of long panels extending therebetween. A second panel is generally W-shaped and comprises a central glue section, a pair of a lower side glue sections, a pair of upper glue flaps, a pair of long panels extending between the lower side glue sections and the pair of upper glue flaps, and a pair of long panels extending between the lower side glue sections and the central glue sections. The first and second panels are alternated and joined by adhering the central glue section of the first panel to the central glue section of the second panel and by the glue flaps of the first panel being laminated between the lower side glue sections of the second panel and the upper glue flaps of an adjacent second panel. In the expanded condition in use, the long panels of the first panel and the long panels extending between the lower side glue sections and the central section of the second panel form a central array of stacked diamond-shaped elements. These long panels of the first and second panels along with the pair of long panels extending between the lower side glue sections and the pair of upper glue flaps of the second panel form an array of stacked triangle-shaped elements adjacent and outside of the diamond shapes.

As many first and second panels may be alternately stacked as desired to give the desired height to the void filler. Further, the void filler may be collapsed for compact shipping and storage.

It has been found that this construction of corrugated void filler is both effective and relatively economical.

DETAILED DESCRIPTION OF THE INVENTION

Figure 1:
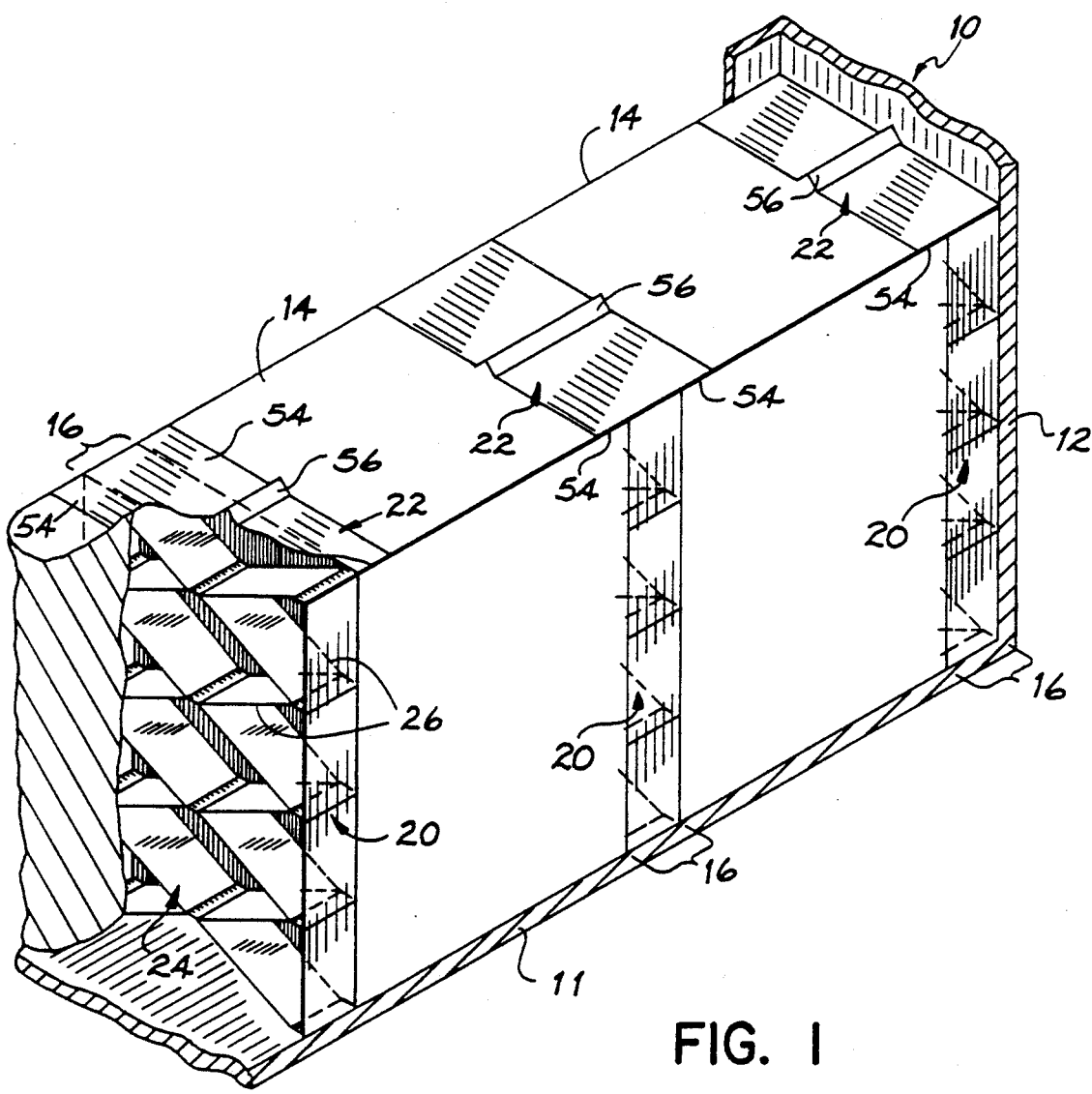
FIG. 1 is an isometric pictorial view with parts broken away showing the environment in which the void filler of the present invention is used.

Referring to FIG. 1, a container 10 typically includes a floor 11 and side or end walls 12 and a ceiling (not shown) into which a load 14 is placed for shipment. Adjacent loads 14 are separated by voids 16 and typically the loads 14 are also separated by voids between the side or end walls 12. A void filler 20 is placed between the adjacent loads 14 and the load 14 and side or end walls 12.

The void filler 20 comprises generally an overhead suspension member 22 which suspends the void filler 20 from the top of the load 14 and a plurality of panels 24 which are joined together but capable of expanding downwardly under the weight of gravity to fall from the top of the load 14 to the floor 11 of the container 10 and thereby fill the void 16 between loads 14 and between loads 14 and end or side walls 12. In the expanded condition, the void filler define generally a pair of planar sides 26 which contact the sides of the spaced loads 14 and/or side or end walls 12. The void filler 20 is relatively strong in a direction transverse of the planar sides 26 whereby it is effective in preventing shifting of the load during transit.

Figure 2A:
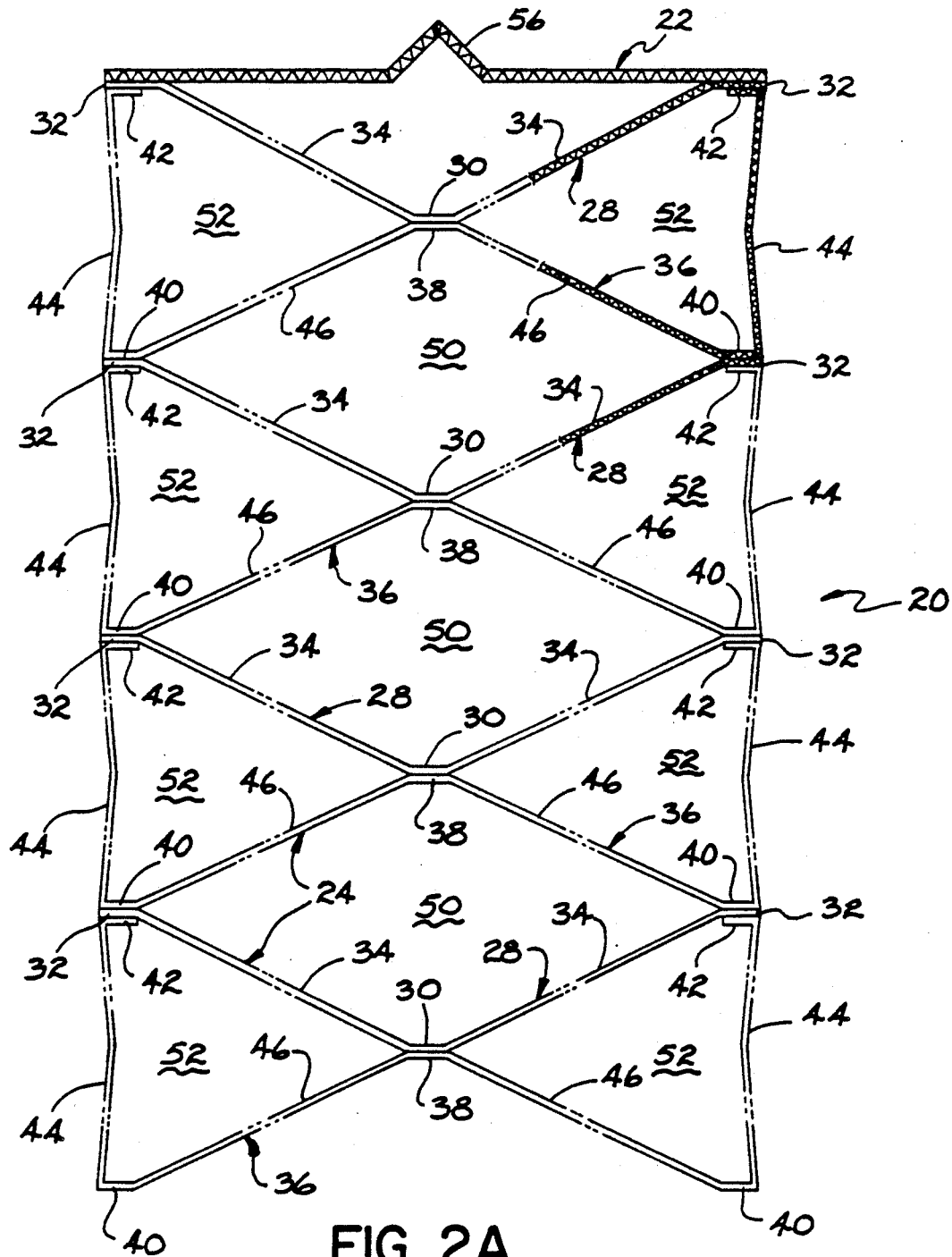
FIG. 2A is a side elevation of the void filler of the present invention in the expanded condition.
Figure 2B:
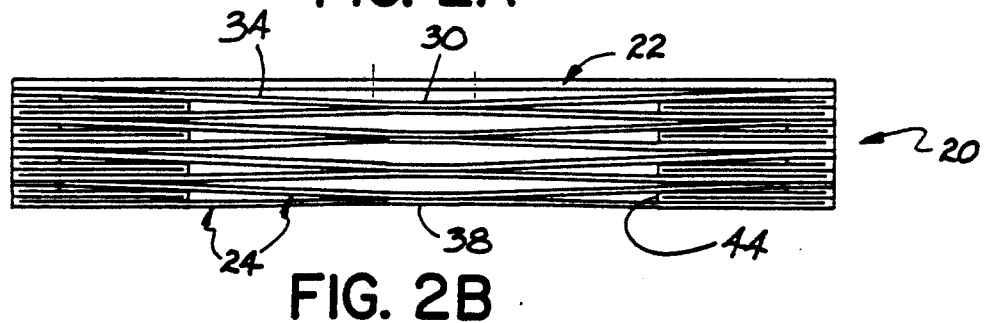
FIG. 2B is a side elevation of the void filler of the present invention in the collapsed condition.

Referring now to FIG. 2A, the void filler 20 of the present in its expanded condition is illustrated. The void filler 20 includes alternate panels 24 which are adhered together along a center axis and along the side edges whereby the void filler 20 may be collapsed, as shown in FIG. 2B, for storage and shipment and then expanded as shown in FIG. 2A to fill the void 16 between loads 14.

A first panel 28 is generally of a V-shaped configuration and comprises a central glue section 30, a pair of glue flaps 32 at the outboard edges thereof, and a pair of long panels 34 extending therebetween. A second panel 36 is generally W-shaped and comprises a central glue section 38, a pair of lower side glue sections 40, a pair of upper glue flaps 42, a pair of long panels 44 extending between the lower side glue sections 40 and the pair of upper glue flaps 42, and a pair of long panels 46 extending between the lower side glue sections 40 and the central glue sections 38.

The central glue section 30 of the first panel 28 is adhered such as by gluing to the central glue section 38 of the second panel 36.

The glue flaps 32 of the first panel 28 are laminated between the lower side glue sections 40 of the second panel 36 and the upper glue flaps 42 of an adjacent second panel 36 to form a three layer laminate such as by gluing.

In the expanded condition as shown in FIG. 2A, the long panels 34 of the first panel 28 and the long panels 46 of the second panel 36 extending from the central glue sections 30 and 38, respectively, form an vertical array of diamond-shaped cells 50. Likewise, the long panels 34, 46 along with the long panels 44 of the second panel 36 extending between the lower side glue sections 40 and the upper glue flaps 42 form a vertical array of triangular-shaped cells 52 on either side of the vertical array of diamond-shaped cells 50.

At the top, the suspension member 22 may be formed of a sheet of corrugated board having side edges 54 extending beyond the planar sides 26 of the void filler 20 (FIG. 1) such that those side edges 54 rest on top of the spaced loads 14 and support the void filler 20 therefrom. A fold or crease 56 may be placed in the top sheet 22 to permit its expansion outwardly to permit collapsing of the void filler 20 as shown in FIG. 2B.

Preferably, the void filler 20 is formed of C-flute corrugated. The flutes run between the planar sides 26 of the void filler 20 providing the void filler 20 with good compressive strength in that direction to restrain the spaced loads 14 from movement during transit.

As stated, as many panel sections 28, 36 may be built up as desired to give a void filler of a desired vertical height when expanded. By way of example, to construct a void filler having a vertical height of 60 inches, a width of 36 inches, and a face-to-face depth of 8 inches, four W-shaped panels 36 are provided of 8-inch wide corrugated. The pair of second panel 36 long panels 44 extending between the lower side glue sections 40 and upper glue flaps 42 are 15 inches in length. The pair of second panel 36 long panels 46 extending between the lower side glue sections 40 and the central glue sections 38 are 18 inches in length. The central glue sections 38, lower side glue sections 40, and upper glue flaps 42 are all 2 inches in length. Thus, the total length of the W-shaped panel 36 is 76 inches.

The V-shaped first panel 28 has a central glue section 30 which is 2 inches long, a pair of glue flaps 32 which are 2 inches long with 18-inch long panels 34 extending therebetween. Thus, the overall length of the V-shaped section 28 is 42 inches. By using four W-shaped sections 36 and four V-shaped sections 28, an overall height of 60 inches and width of 36 inches is obtained in the expanded condition.

In the expanded condition, as shown in FIG. 2A, the central cells 50 are diamond shaped with 18-inch sides and the triangular-shaped cells 52 are 18 inches on the side with a 15-inch base.

Thus having described the invention, what is claimed is:

1. A collapsible and expandable void filler comprising a plurality of first and second corrugated panels alternately stacked one on another and adhered together, said first panel being generally V-shaped in the expanded condition and comprising a central glue section, a pair of glue flaps at the outboard edges thereof, and a pair of long panels extending therebetween, said second panel being generally W-shaped in the expanded condition and comprising a central glue section, a pair of lower side glue sections, a pair of upper glue flaps, a pair of long panels extending between said lower side glue sections and said pair of said upper glue flaps, and a pair of long panels extending between said lower side glue sections and said central glue section, said central glue section of said first panel being adhered to said central glue section of said second panel, said glue flaps of said first panel being laminated between the lower side glue section of said second panel and the upper glue flaps of an adjacent second panel, in the expanded condition in use said long panels of said first panel and said long panels of said second panel extending between said lower side glue sections and said central glue sections forming a vertical array of stacked diamond-shaped cells, and said pair of long panels extending between said lower side glue sections and said pair of upper glue flaps of said second section forming therewith a vertical array of stacked triangle-shaped cells adjacent to said diamond-shaped cells.

* * * * *